US009104655B2

(12) United States Patent
Kyaw et al.

(10) Patent No.: US 9,104,655 B2
(45) Date of Patent: Aug. 11, 2015

(54) SYSTEMS AND METHODS FOR PERFORMING CONTEXTUAL CLASSIFICATION USING SUPERVISED AND UNSUPERVISED TRAINING

(71) Applicant: AOL Inc., Dulles, VA (US)

(72) Inventors: Thu Kyaw, Reston, VA (US); Sang Chul Song, Aldie, VA (US); Vineet Mahajan, Ashburn, VA (US); Elena Haliczer, New York, NY (US)

(73) Assignee: AOL Inc., Dulles, VA (US)

( * ) Notice: Subject to any disclaimer, the term of this patent is extended or adjusted under 35 U.S.C. 154(b) by 162 days.

(21) Appl. No.: 13/573,727

(22) Filed: Oct. 3, 2012

(65) Prior Publication Data

US 2013/0151443 A1    Jun. 13, 2013

Related U.S. Application Data

(60) Provisional application No. 61/542,537, filed on Oct. 3, 2011.

(51) Int. Cl.
 *G06F 15/18* (2006.01)
 *G06F 17/27* (2006.01)
 *G06K 9/62* (2006.01)

(52) U.S. Cl.
 CPC .............. *G06F 17/27* (2013.01); *G06K 9/6227* (2013.01)

(58) Field of Classification Search
 None
 See application file for complete search history.

(56) References Cited

U.S. PATENT DOCUMENTS

| | | |
|---|---|---|
| 5,867,799 A | 2/1999 | Lang et al. |
| 6,161,130 A | 12/2000 | Horvitz et al. |
| 6,882,990 B1 | 4/2005 | Barnhill et al. |
| 7,756,535 B1 | 7/2010 | Diao et al. |

(Continued)

OTHER PUBLICATIONS

Yildiz et al. "Ordering and Finding the Best of K>2 Supervised Learning Algorithms", IEEE PAMI, vol. 28, No. 3, 2006, pp. 392-402.*

(Continued)

*Primary Examiner* — Li-Wu Chang
(74) *Attorney, Agent, or Firm* — Finnegan, Henderson, Farabow, Garrett & Dunner, LLP (57) ABSTRACT

Computerized systems and methods are disclosed for performing contextual classification of objects using supervised and unsupervised training. In accordance with one implementation, content reviewers may review training objects and submit supervised training data for preprocessing and analysis. The supervised training data may be preprocessed to identify key terms and phrases, such as by stemming, tokenization, or n-gram analysis, and form vectorized objects. The vectorized objects may be used to train one or more models for subsequent classification of objects. In certain implementations, preprocessing or training, among other steps, may be performed in parallel over multiple machines to improve efficiency. The disclosed systems and methods may be used in a wide variety of applications, such as article classification and content moderation.

15 Claims, 7 Drawing Sheets

(56) References Cited

U.S. PATENT DOCUMENTS

| | | |
|---|---|---|
| 2002/0059221 A1 | 5/2002 | Whitehead et al. |
| 2002/0107853 A1 | 8/2002 | Hofmann et al. |
| 2003/0204508 A1* | 10/2003 | Cantu-Paz et al. ............ 707/100 |
| 2005/0238238 A1 | 10/2005 | Xu et al. |
| 2008/0138783 A1 | 6/2008 | Karkanias et al. |
| 2008/0249764 A1* | 10/2008 | Huang et al. ....................... 704/9 |
| 2009/0119242 A1* | 5/2009 | Vargas Martin ................ 706/48 |
| 2010/0306144 A1 | 12/2010 | Scholz et al. |
| 2013/0018824 A1* | 1/2013 | Ghani et al. .................... 706/12 |

OTHER PUBLICATIONS

International Search Report for International Application No. PCT/US 12/58575, mailed on Dec. 21, 2012 (2 pages).

Written Opinion of the International Searching Authority and Search History for International Application No. PCT/US 12/58575, mailed on Dec. 21, 2012 (12 pages).

* cited by examiner

Figure 7

SYSTEMS AND METHODS FOR PERFORMING CONTEXTUAL CLASSIFICATION USING SUPERVISED AND UNSUPERVISED TRAINING

This application claims the benefit of U.S. Provisional Application No. 61/542,537, filed Oct. 3, 2011, the disclosure of which is expressly incorporated herein by reference in its entirety.

TECHNICAL FIELD

The present disclosure relates to content assessment and computerized systems and methods for performing contextual classification of objects. More particularly, and without limitation, the present disclosure relates to systems and methods for selecting among a plurality of algorithms or models, in parallel, on a pluggable platform, and performing contextual classification using both supervised and unsupervised training.

BACKGROUND

Contextual classification of objects enables content providers to determine that objects share similar properties and group those objects with one another to meet various needs or objectives. For example, content providers may seek to group like objects together, so that content consumers can easily access similar content. As another example, objects may be contextually classified to facilitate filtering of content, such as by classifying and removing inappropriate content.

Contextual classification may be performed on a wide variety of objects, such as web pages or finite objects like text, images, videos, and other content. In the context of web pages, contextual classification may be performed to group web pages by topic, thus improving the organization of a web site. By placing similar content together in one location, content providers make it easier for users to find content that suits their interests, thus increasing the likelihood that users will view multiple web pages within a web site upon finding a single web page on that web site that suits their interests or needs.

Prior methods for contextual classification have relied primarily on manual input by editors or users. For example, some prior techniques have relied on manual tagging by persons designated as content reviewers. Such content reviewers may be employees of a particular company, such as the editors of a particular web site, or they may also be users of a web site. Regardless of the criteria for selection of persons to review and classify content, there are several disadvantages associated with the manual classification of objects. For example, manual tagging of objects is time-consuming. For content providers with numerous objects to classify, manual classification may take so long as to decrease the utility of the classification. By way of example, an online news provider that relies on manual classification of news stories will need stories classified quickly in order to guide users to the stories in which they are interested before other news sources capture the users' attention (or before the news becomes stale). If a content provider releases a large volume of new content per day, it may be unfeasible to have each object tagged within an acceptable time frame.

Contextual classification may involve classification of an object based on a single parameter or on numerous parameters. For example, a web page may be classified based on genre (e.g., politics, religion, sports), audience (e.g., children, adults), mood (e.g., funny, depressing, inciting), and numerous other parameters. Further, whereas some parameters may be assigned a binary value (e.g., true/false, yes/no), other parameters may be assigned a wide variety of values and require more analysis to determine the appropriate value.

In order manually to classify a large volume of content, a large number of people must be involved, which leads to the second drawback of manual tagging—it can be very expensive. A content provider that produces numerous web pages or articles must dedicate a large number of editors to classifying content if the content is to be classified accurately and in a timely fashion. Further, depending on the nature of the content produced, content providers may require that such editors have certain educational qualifications or prior work experience. As the number and skill level of editors increases, the cost of manual contextual classification increases as well.

The present disclosure is directed to addressing one or more of the above-referenced challenges or drawbacks with conventional methods and techniques for contextual classification. The present disclosure provides improved systems and methods for performing contextual classification using supervised and unsupervised training. Among other features and advantages, certain embodiments of the present disclosure may utilize parallel machine learning to determine the best model/parameter combination for contextual classification of objects based on supervised and unsupervised training. Exemplary implementations of the disclosed embodiments include article classification and comment moderation.

SUMMARY

Consistent with the present disclosure, systems and methods are provided for performing contextual classification of objects using supervised and unsupervised training. Embodiments consistent with the present disclosure include, for example, systems and methods for collecting supervised training data from content reviewers, preprocessing the supervised training data to create vectorized objects, and training models using the vectorized objects. The disclosed systems and methods may be used to automatically classify objects based on the models.

In accordance with one disclosed exemplary embodiment, a computer-implemented method is provided for performing contextual classification of objects. According to the method, supervised training data is received from at least one content reviewer and stored in a database. The supervised training data may be preprocessed to form at least one vectorized object. The at least one vectorized object may be used to train a plurality of models by applying a plurality of machine learning algorithms thereto. An optimal model may be identified from the plurality of models and used to classify a candidate object.

In accordance with another exemplary embodiment, a computer-implemented system is provided for performing contextual classification of objects. The system includes a database and a processor. The database may be used to store supervised training data collected from at least one content reviewer. The processor may be configured to preprocess the supervised training data to form at least one vectorized object. Further, the processor may be configured to train a plurality of models by applying a plurality of machine learning algorithms to the at least one vectorized object. From the plurality of models, an optimal model may be identified and used to classify a candidate object.

According to still another exemplary embodiment, a computer-readable medium is provided including instructions for performing contextual classification of objects. When executed, the instructions perform steps including collecting supervised training data from at least one content reviewer. The steps further include preprocessing the supervised training data to form at least one vectorized object. Moreover, the at least one vectorized object may be used to train a plurality of models by applying a plurality of machine learning algorithms thereto. An optimal model may be identified from the plurality of models and used to classify a candidate object.

It is to be understood that the disclosure is not limited in its application to the details of construction and to the arrangements of the components set forth in the following description or illustrated in the drawings. The present disclosure encompasses embodiments in addition to those described herein, as well as those practiced and carried out in various ways. Also, it is to be understood that the phraseology and terminology employed herein, as well as in the abstract, are for the purpose of description and should not be regarded as limiting.

As such, those skilled in the art will appreciate that the conception upon which this disclosure is based may readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF THE DRAWINGS

The accompanying drawings, which are incorporated in and constitute part of this specification, and together with the description, illustrate and serve to explain the principles of various exemplary embodiments.

DETAILED DESCRIPTION

Reference will now be made in detail to the exemplary embodiments implemented according to the disclosure, the examples of which are illustrated in the accompanying drawings. Wherever possible, the same reference numbers will be used throughout the drawings to refer to the same or like parts.

As discussed above, prior methods of contextual classification have relied primarily on manual classification of objects. Specifically, prior methods have required content providers to task personnel with analyzing and classifying content according to specified criteria. This sort of manual classification of content can also be referred to as "supervised" classification. Although supervised classification of objects can suffer from certain inefficiencies (e.g., time-consuming, costly), supervised classification can also provide certain benefits. Perhaps the biggest advantage of supervised classification of objects is accuracy or reliability of classification. Content providers that employ editors dedicated to the sole task of classifying content are likely to have more reliably classified content than those providers that may classify content solely through automated methods.

Unfortunately, for high-volume content providers, supervised classification of all content is simply unfeasible. To accommodate the needs of such providers, the disclosed embodiments incorporate "unsupervised" classification methods for contextual classification. According to the disclosed embodiments, unsupervised classification may be performed automatically using machine learning techniques, thus overcoming the above-discussed disadvantages of supervised classification methods. Whereas supervised classification methods can be faulted for being time-consuming and costly, the automated nature of unsupervised classification provides for contextual classification of objects to be performed quickly and cheaply. A drawback of unsupervised classification, however, is that unsupervised classification, if not properly tuned, may be unreliable. Accordingly, to perform contextual classification of objects quickly, cheaply, and reliably, embodiments consistent with the present disclosure may incorporate both supervised and unsupervised classification methods.

In accordance with certain embodiments, supervised classification may be performed by persons employed by a content provider for that purpose. This may be particularly suitable for content providers that produce a high volume of content and have the resources to employ persons dedicated to contextual classification of their content. In an alternative embodiment, supervised classification of a particular content item (e.g., an article) may be performed by the creator of that content item (e.g., the author of the article). In yet another embodiment, content providers may allow users (i.e., content consumers) to perform supervised classification of content. This responsibility may be provided to all users or only to users who meet certain criteria. For example, the authority to perform supervised classification of content may be provided to certain users who have been given "moderator" or "expert" status. A user may achieve such a status upon a determination that a threshold number of classifications made by the user were proper. Such a determination may be made, for example, when a threshold number of provisional classifications provided by a user were ultimately adopted, either through validation by employees of the content provider or through automated validation methods (e.g., the unsupervised classification methods disclosed herein).

Supervised classification of objects may be performed by, among other methods, tagging objects with pre-defined tags. For example, a content reviewer may be presented with a pre-defined set of tags that may either be selected or left unselected. In such a situation, such tags may be associated with a binary value (e.g., true/false, yes/no, 0/1) to indicate whether the tag is properly associated with the object. Alternatively, tags may be assigned one of several different values. For example, whereas a tag for "Scary?" may be assigned a binary value (e.g., yes/no, true/false, scary/not scary), a tag for "genre" may be assigned one of a broader variety of values, as genre is not susceptible to binary classification. As an example, a genre tag may be assigned one of a pre-defined set of values: politics, religion, sports, opinion, or business. In one embodiment, the possible values for a given tag are pre-defined by an editor associated with the content provider who is familiar with the range of topics that are likely to be published by the content provider. By providing a pre-defined set of values, content providers may ensure that similar content is tagged similarly. In other words, two different content reviewers will not be able to tag one article as relating to the "election" genre and another article as relating to the "politics" genre when the content provider would prefer all political articles to be clustered together as belonging to the "politics" genre.

In an alternative embodiment, tags may be assigned open-ended values, such as by providing an input box associated with a tag. For example, a content reviewer may review an object and assign the object the value that he or she sees fit, without being restricted only to a pre-defined set of values. Whereas this alternative embodiment may allow for more finely tuned or better descriptive values, similar articles are likely to be tagged differently because of their dependence on the subjective judgments of persons having different vocabularies.

In addition to, or as an alternative to, the disclosed methods for supervised classification of objects, embodiments disclosed herein may utilize unsupervised classification methods. As the name implies, unsupervised classification may be performed automatically without direct human supervision or interaction, thus allowing unsupervised classification to be performed more cheaply and quickly than supervised classification. In one embodiment, objects may be analyzed to identify key terms that are descriptive of the object as a whole. As discussed herein, such analyses may involve preprocessing of an object to create a list of terms (e.g., all terms associated with an object or only key terms), such as by identifying terms based on tokenization, stemming, n-gram analysis, phrasal analysis, or any other method for segmentation and representation of objects by a plurality of terms. These terms may be used automatically to assign tags to objects. For example, the terms may be compared to one or more lists of terms known to be associated with candidate tags. Upon identifying a threshold number of matches between the terms derived from an object and a list of terms known to be associated with a tag/classification, the object may be tagged. In one embodiment, the tags/classifications and the known terms assigned thereto may have been designated by an editor or other person associated with a content provider, thus incorporating an element of supervised classification.

Unsupervised classification methods may also use previously classified objects to classify other objects. For example, an object may be classified using either supervised classification (e.g., manually tagging by editors) or unsupervised classification (e.g., automated tagging based on term analysis) and then compared to unclassified objects for similarities. If a classified object is sufficiently similar to an unclassified object, the unclassified object may be tagged with one or more of the same classifications as the classified object. The similarity of objects may be analyzed based on key terms derived from the object or a comparison of all terms from the objects.

In accordance with certain embodiments, classification of objects is performed using machine learning techniques. Such techniques may be used to design algorithms that recognize patterns within objects and make intelligent decisions based on input data. In accordance with certain embodiments, contextual classification of objects incorporates machine learning to identify key terms or phrases within objects and used that information to classify objects into various categories based on training data. Further, unlike prior methods of machine learning, certain embodiments take advantage of parallel processing, so that the training and classification processes may be performed much more quickly than in prior machine learning techniques.

Figure 1:
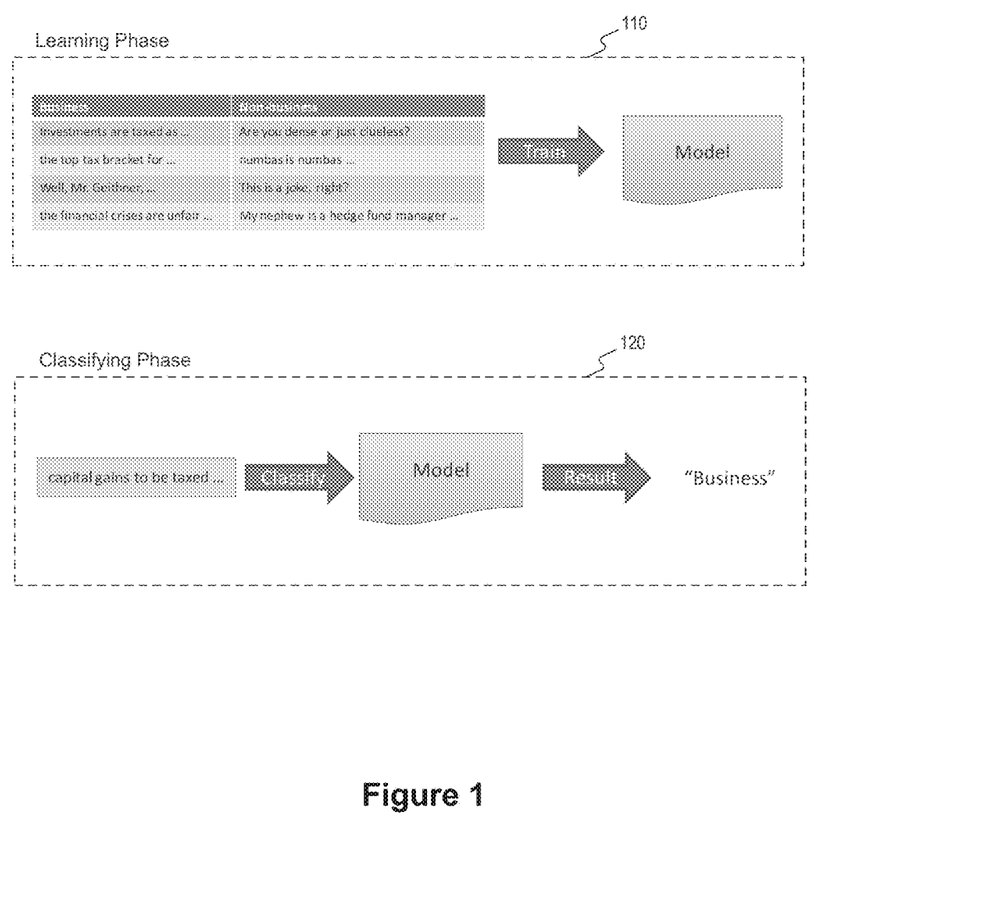
FIG. 1 illustrates exemplary phases from an exemplary method for performing contextual classification of objects, in accordance with an embodiment of the present disclosure.

FIG. 1 depicts two phases of an exemplary machine learning process, in accordance with one embodiment. As shown in FIG. 1, machine learning may comprise both a learning phase 110 and a classifying phase 120. In the learning phase 110, objects may be tagged with various values that describe the objects. Moreover, individual terms or phrases within an object may be tagged as being associated with certain values. In one embodiment, the learning phase 110 may utilize the supervised classification methods discussed herein. For example, in the learning phase 110, information regarding the tags assigned to an object by editors or others performing supervised classification may be collected to learn what sort of information is tied to each tag/classification. This information may then be used to train one or more models for use in the classifying phase 120.

In the classifying phase 120, one or more models trained in the learning phase 110 are used to classify previously unclassified objects. This phase may be considered an unsupervised element of the machine learning process, as such classifications are performed automatically, albeit based on data input during a supervised portion of the machine learning process (i.e., the learning phase 110). In the classifying phase 120, object data may be parsed in accordance with a model developed during the learning phase 110. As discussed in more detail below, the nature of the parsing applied to an object may vary, as the optimal model for one class of objects may differ from that corresponding to another class of objects. Once the object has been parsed, the model is then utilized to classify the object into one or more classifications. In one embodiment, this classification may be verified using supervised classification techniques (i.e., an editor may validate the classification). This classification may also be used as additional training data that is input into the learning phase 110 and used to train a new model and/or refine a previous model.

In the exemplary illustration of machine learning techniques for contextual classification depicted in FIG. 1, objects are analyzed to determine whether they may be classified as "business" objects. In the learning phrase 110, objects are preprocessed to identify various terms and/or phrases for classification. In one embodiment, the terms are identified by editors or other persons as part of supervised classification. As shown in FIG. 1, these terms and/or phrases may include sentences or sentence fragments from an object. Alternatively, terms identified from objects for training in the learning phase 110 may be single words, n-grams, tokens, stems, phrases, or other combinations of letters and/or words, as discussed in more detail herein. In FIG. 1, the identified terms have been classified as either "business" or "non-business." In accordance with one embodiment, these classifications are supervised classifications. In other words, the classifications are made by editors, users, or other persons who have analyzed the objects.

In the example depicted in FIG. 1, the terms "Investments are taxed as . . . " and "the top tax bracket for . . . " have been classified as business terms. Accordingly, the objects associated with these terms may be classified as business objects. In one embodiment, the classification of an object containing these terms may be based on a determination of whether a threshold number of terms classified as business terms are present in the object. Moreover, the determination of whether to classify an object containing these business terms as a business object may take into consideration the number of terms classified as non-business terms, as a high number of non-business terms relative to a low number of business terms may indicate that the object as a whole is less likely to be appropriately classified as a business object. As shown in FIG. 1, the terms "Are you dense or just clueless?" and "My nephew is a hedge fund manager . . . " have been designated as non-business terms. With respect to the term "My nephew is a hedge fund manager . . . ," an editor or other reviewer of the object containing this term may have determined that, despite its inclusion of the sub-term "hedge fund," the term as a whole is insufficiently tied to business to qualify as a business term. Alternatively, an automated (i.e., unsupervised) process may have determined that this term should be classified as non-business due to the proximity of the phrase "hedge fund" to the word "nephew." Data pertaining to these classified terms and/or objects are the used to train one or more models, which may then be used to classify additional terms and/or objects.

As shown in FIG. 1, once terms and/or objects have been classified and used to train one or more models, other terms and/or objects may then be classified using the one or more models. For example, the term "capital gains to be taxed" is input into one or more models that were trained during the learning phase 110. The one or more models compare the term with other terms to determine whether the term should be classified as a business or a non-business term. In this example, the term "capital gains to be taxed . . . " is classified as a business term. This determination may be based on a comparison of the term to terms or objects classified during the learning phase 110 and input into the one or more models employed as part of the classifying phase 120. In one embodiment, one or more terms, or sub-terms, from within the term "capital gains to be taxed . . . " may be compared with the business and non-business terms used to train the one or more models employed in the classifying phase 120. For example, the terms "capital gains" and "taxed" may be compared to terms, or sub-terms, analyzed during the learning phase 110 to determine that these sub-terms are business terms. Thus, the term "capital gains to be taxed . . . ," as a whole, may be classified as a business term.

Figure 2:
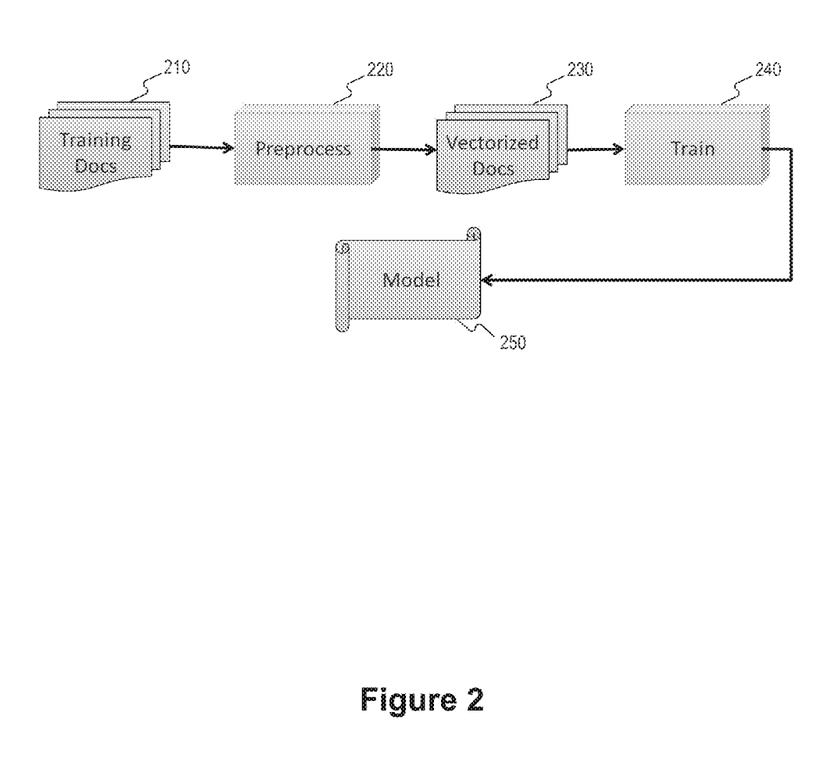
FIG. 2 illustrates a flow diagram of an exemplary method for performing contextual classification of objects, in accordance with an embodiment of the present disclosure.

FIG. 2 depicts a general processing flow of contextual classification of objects using supervised and unsupervised training, in accordance with an embodiment. First, objects and/or their terms may be classified into various classifications to create training objects (or "training docs") 210. These training docs are then preprocessed 220 to create one or more vectorized objects (or "vectorized docs") 230. These vectorized docs 230 are used in training 240 to develop one or more models 250. After one or more models have been trained and analyzed, an optimal model for contextual classification may be determined and used for future classification of objects.

Training docs 210 may be developed in a manner similar to that described with respect to learning phase 110 of FIG. 1. As described with respect to FIG. 1, this may include supervised classification performed by editors or users who have reviewed one or more objects and assigned one or more classifications to those objects and/or one or more terms within those objects. Further, as described above, these classifications may be performed by classifying an object, or a term within an object, by selecting one or more classifications from a pre-defined set of classifications, such as by clicking on a button associated with a particular classification while reviewing the object or term. Alternatively, the classifications may be performed by typing a descriptive label in an input box associated with the object or term. In one embodiment, all objects and terms that have been classified are used in the creation of training docs. In another embodiment, a subset of objects and/or terms that have been classified using the supervised classification techniques disclosed herein may be used as training does. For example, persons involved in the supervised classification of objects, or a subset of such persons comprised of managers or supervisors, may determine which objects or terms are most indicative of a particular classification and, thus, best candidates for training docs. By focusing on only the best training docs, content providers may ensure that only the objects or terms that are most closely tied to a particular classification are used in subsequent steps of the general processing flow shown in FIG. 2 to train models for classification of yet unclassified objects or terms.

Once training docs have been created, they are preprocessed. Several preprocessors may be utilized as part of preprocessing 220. For example, preprocessing 220 may employ one or more of tokenizers, stopword filters, stemmers, feature filters, or vectorizers. Each of these preprocessors may parse information from training docs and put the information in a form better suited for training one or more models used for contextual classification. For example, preprocessing 220 may remove stopwords from training docs that are unlikely to be strongly connected to any particular classification. Exemplary stopwords may include articles, such as "a," "an," and "the," as well as prepositions, such as "of," "at," and "on." Alternatively, stopwords may be left in training docs to support other processing functions, such as phrasal analysis, which would be adversely affected by the removal of certain commonly used terms (e.g., prepositions common used in prepositional phrases).

Preprocessing 220 may also include tokenization of one or more terms or phrases of the trainings docs. Tokenization may separate the words or phrases associated with a training doc into smaller words, phrases, or fragments (i.e., smaller "tokens"). Numerous methods may be employed for tokenizing training docs as part of preprocessing 220. For example, phrases associated with a training doc may be separated into individual words, as determined by spacing or any other means for detecting separation of words. Alternatively, words or phrases associated with a training doc may be separated into n-grams. Accordingly, preprocessing 220 may divide words or phrases in a training doc into fragments consisting of a pre-defined number of characters (i.e., n-grams). In one embodiment, one n-gram size may be pre-defined for all training docs used by a content provider employing the contextual classification techniques disclosed herein. In another embodiment, n-gram size may vary based on the subject matter of a particular object or training document or based on the average word size for the words associated with the object or training doc. Moreover, n-gram size may be set either manually by an editor or other content reviewer or be set automatically.

Preprocessing 220 may include stemming of words associated with an object or training doc. Stemming is a process of reducing words to their stem, base, or root form. Stemming allows for different words with similar stems to be treated similarly in the training processes disclosed herein. For example, if a training doc designates the words "election," "electoral," and "electable" as associated with politics, these words may each be stemmed to the term "elect," and the word "elect" may be classified as being associated with politics. By stemming similar words to the same root word, or stem, later processing steps (e.g., training) may run more efficiently, as duplicitous terms are reduced.

In accordance with one embodiment, preprocessing 220 converts the one or more training docs 210 into one or more vectorized docs 230. Vectorized docs 230 may be clustered such that similar docs or objects are grouped together for training. For example, vectorized docs 230 that relate to business may be clustered together, such that these documents may be input together into the processes of training 240.

Training 240 inputs data from vectorized docs 230 into various algorithms to generate one or more models 250. In order to determine the best model for contextual classification, training 240 may support and/or implement a variety of algorithms, such as, but not limited to, support vector machine (SVM), Perceptron/Winnow, Bayesian, decision tree, and AdaBoost. Moreover, different objects or object types will be better suited to some algorithms than others. Accordingly, training 240 may involve running each vectorized doc (or group of vectorized docs) through multiple algorithms, so that the best algorithm for each vectorized doc (or group of vectorized docs) may be determined.

For example, vectorized docs 230 may be input into an SVM algorithm to develop one or more models appropriate for contextual classification of a specified object type. Vectorized docs 230 may comprise data linking terms or phrases to one of two possible categories, such as the "business" or "non-business" classifications discussed above with respect to FIG. 1. The SVM may take the vectorized docs 230 and build a model that assigns new data into one category or the other. In other words, the SVM algorithm may train a model based on the vectorized docs, such that the model will properly classify future data (e.g., vectorized docs or objects) as falling into one of two potential categories.

Prior machine learning techniques run data through algorithms sequentially, thus potentially requiring a large amount of time to develop models corresponding to each algorithm and each set of data. In accordance with certain embodiments, training 240 is performed on multiple vectorized docs (or groups of vectorized docs) 230 in parallel. The parallel machine learning techniques of the embodiments disclosed herein provide significant advantages over prior machine learning techniques. For example, by dividing machine learning processes over fifty machines, the training processes associated with contextually classifying objects may be performed up to fifty times faster than if the processes were performed sequentially on one machine. This increased processing speed can allow for content providers to generate and compare a much larger number of classification models, thus increasing the likelihood that the optimal model will be chosen. Moreover, content providers that produce a large volume of new and constantly changing content may need to determine optimal models for classification of new content types quickly, so that the content is properly classified before it becomes stale.

Certain embodiments may leverage parallelism in a Map/Reduce paradigm in order to generate a large number of machine learning models and find the best algorithm and parameters. Moreover, certain embodiments may also provide a pluggable placeholder for heterogeneous tools and algorithms. In one embodiment, the parallel machine learning processes disclosed herein may be implemented using Hadoop, as discussed below in connection with FIG. 5. Several parallel machine learning tools are available, including Mahout, Mallet, libsvm, and Weka. Mahout does not yet support the necessary classification algorithms, and other currently available tools do not run natively on Hadoop. Accordingly, the embodiments disclosed herein are designed for a flexible machine learning platform running Hadoop. This platform supports a wide range of algorithms and leverages publicly available implementations. Contrary to prior machine learning environments, this platform may be used efficiently to generate and test tens or hundreds of thousands of models and choose the best models from among this large pool to use for future classification of objects. Whereas prior sequential parallel machine learning techniques employed in other fields took up to a week, depending on the data input into the models and the number of total models trained, the disclosed parallel machine learning techniques may generate an optimal model for contextual classification of an object pool within an hour.

Figure 3:
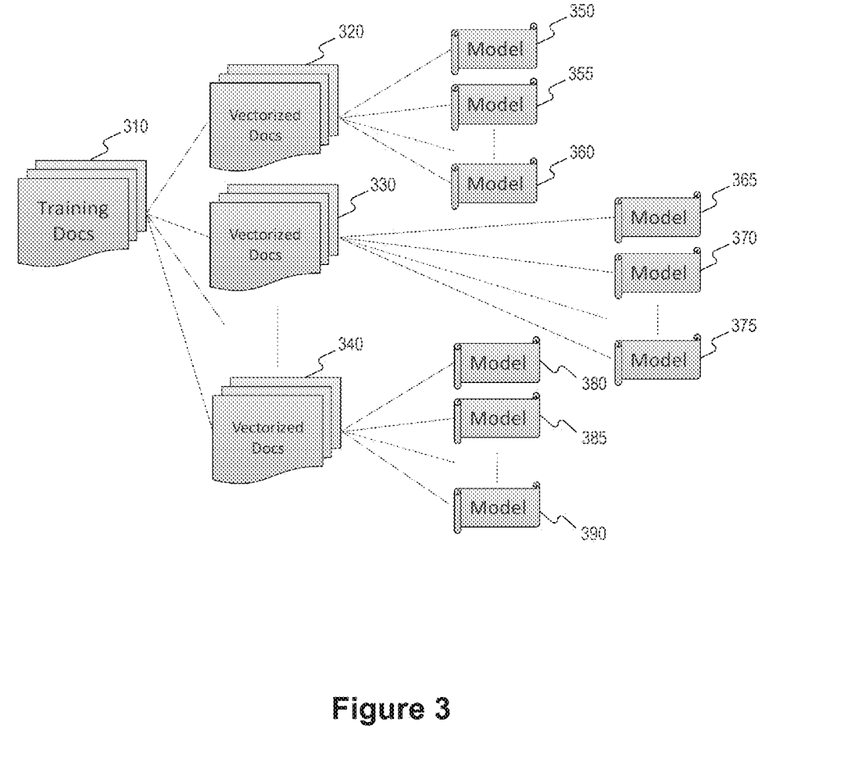
FIG. 3 illustrates an exemplary diagram for employing parallel machine learning to classify objects, in accordance with an embodiment of the present disclosure.

FIG. 3 depicts an exemplary parallel processing flow for contextually classifying objects, in accordance with certain embodiments. In similar fashion to that discussed above with respect to FIG. 2, training docs 310 may be preprocessed to generate one or more vectorized docs (or vectorized doc groups) 320, 330, and 340. Each of these vectorized doc groups may then be used to train one or more models, such as models 350-390, using one or more machine learning algorithms. In one embodiment, both the preprocessing of training docs and training of models using vectorized docs may be performed in parallel over one or more machines, such as by using Hadoop.

Figure 4:
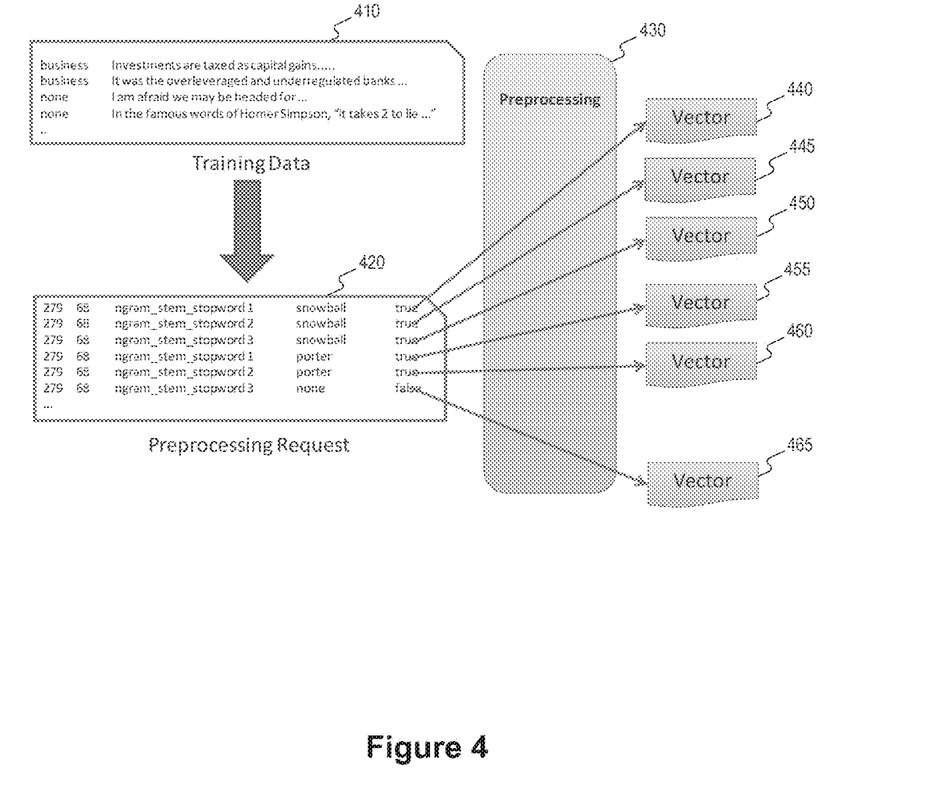
FIG. 4 illustrates exemplary steps for preprocessing training data to create vectorized objects, in accordance an embodiment of the present disclosure.

FIG. 4 depicts an exemplary preprocessing technique, in accordance with certain embodiments. As shown in FIG. 4, training data may be comprised of term-classification pairs, which may be stored in training docs, such as training docs 210 or 310. For example, the exemplary training data 410, shown in FIG. 4, indicates that the term "Investments are taxed as capital gains . . . " is paired with the "business" classification and "I am afraid we may be headed for . . . " is paired with the "none" classification (or is not assigned to any particular classification). Next, preprocessing may be performed on training data 410, in accordance with preprocessing request 420. As seen in FIG. 4, preprocessing request 420 may specify parameters, such as n-grams, stems, or stopwords, as well as one or more values for each of those parameters. Preprocessing 430 may be performed as specified by preprocessing request 420 to generate one or more vectors, such as vectors 440-465. In one embodiment, preprocessing 430 may be performed sequentially on one machine. In another embodiment, preprocessing 430 may be performed over multiple machines in parallel (e.g., a Hadoop cluster). These vectors may then be used to train models for use in future classification of objects.

Figure 5:
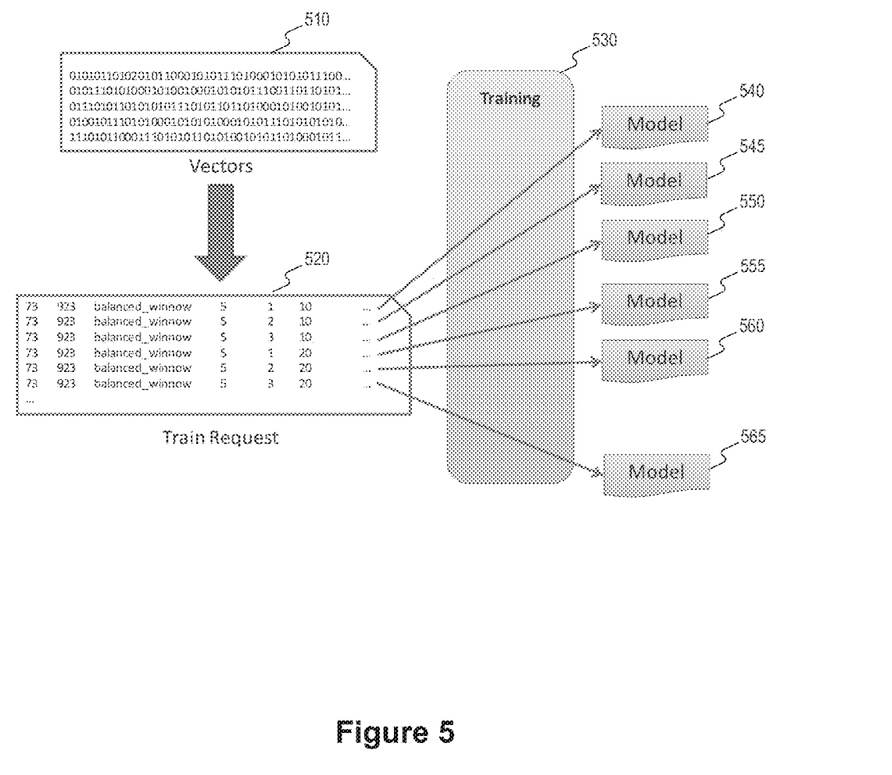
FIG. 5 illustrates exemplary steps for training one or more models using vectorized objects, in accordance with an embodiment of the present disclosure.

FIG. 5 illustrates an exemplary training flow, in accordance with certain embodiments. Vectors 510 containing preprocessed training data are used in conjunction with one or more train requests, such as train request 520, to train one or more models, such as models 540-565. Train request 520 may include information specifying one or more algorithms, along with associated parameters, for application to vectors 510. For example, train request 520, as shown in FIG. 5, depicts six parameter sets, each of which relates to the balanced winnow training algorithm. In one embodiment, train requests are run sequentially on one machine, as part of training 530. In another embodiment, train requests may be run in training 530 in parallel over multiple machines (e.g., a Hadoop cluster). Training 530 may be performed using one or more machine learning tools, such as Mahout, Weka, Mallet or Mallet+SVMLite to generate models 540-565.

The disclosed methods and systems for contextual classification of objects may be used in a variety of applications and implementations. In one embodiment, the disclosed methods and systems may be used for article classification. In this embodiment, articles may be classified with one or more tags using the supervised classification methods described herein. For example, an article may be tagged by the author of the article, an editor of the article, another employee of the content provider publishing the article, or a reader of the article.

Such a person may select one or more pre-defined tags and/or input one or more additional tags, such as by using a text input box.

After an article has been classified using the supervised classification methods disclosed herein, the article may then be suitable for use in training one or more models to classify other articles. In one embodiment, the article is first preprocessed to form one or more vectorized objects, such as by performing tokenization, stemming, and/or n-gram analysis on the article. The one or more resultant vectorized objects are then used to train one or more models for classification of future articles. Accordingly, the tags/classifications applied to an article by its author, editor, reader, or other reviewer, may be used to develop one or more models for automatically classifying similar articles in the future. As discussed in further detail herein, many models may be trained and compared, such that the most efficient and accurate model may be chosen for future use as a classifying model. By using the disclosed systems and methods of contextual classification for article classification, articles may be classified quickly and reliably, such that their intended readers may locate them easily.

In another embodiment, the disclosed systems and methods may be used for comment moderation. Content providers often provide the ability for their consumers to comment on their content. Generally, user comments are displayed along with (usually below) the subject content. Unlike articles or other content authored and/or edited by the content provider, or its employees/agents, comments are generally written by third-parties. Like articles published by a content provider, user comments should also be reviewed to ensure that their content will not be objectionable to readers. Unfortunately, due to the magnitude of user comments received by larger content providers, manual review of comments is unfeasible. Accordingly, the disclosed embodiments may be employed to filter automatically through user comments and reject or publish the comments, as appropriate.

Similar to article classification, comment moderation may begin with supervised classification of comments. Such supervised classification may be performed, for example, by the author or editor of the article that is the subject of the comment, some other employee or agent of the content provider, or a third-party user or subscriber of the content provider. In one embodiment, a third-party user or subscriber may be given authority to moderate comments based on a determination that the user is a "trusted" user. For example, the user may be given "trusted" user status if a threshold of comments flagged by the user as inappropriate were also flagged by other users as inappropriate or classified as inappropriate by the unsupervised (i.e., automated) classification techniques disclosed herein. In certain embodiments, supervised classification of comments may be comprised simply of tagging or flagging the comment as abusive or not abusive. In other embodiments, other classifications may be applied to comments, such as helpful, funny, recommended, or off-topic.

After comments have been classified (e.g., as abusive or non-abusive) by using the supervised classification methods disclosed herein, the comments may then be preprocessed to obtain vectorized data for use in training models for moderation of future comments. For example, key terms may be identified (e.g., by tokenization, stemming, or n-gram analysis) and associated with a certain classification (e.g., abusive, non-abusive). Accordingly, profane or obscene terms may be classified as abusive in these vectorized objects. Once the models have been trained using the vectorized data, they may be compared to determine the best model to use for comment moderation. In one embodiment, different models may be developed for moderation of comments directed to different subject matter. For example, comments deemed aggressive or abusive when directed to an article focused on education may not be deemed aggressive or abusive when directed to an article focused on sports. Once a model has been developed for moderation of comments directed to a particular article or subject matter, the model may be applied to moderate future comments directed to the same article or subject matter.

Embodiments herein include computer-implemented methods, tangible non-transitory computer-readable mediums, and computer-implemented systems. The computer-implemented methods may be executed, for example, by one or more processors that receive instructions from one or more non-transitory computer-readable storage mediums. Similarly, the systems disclosed herein may include at least one processor and memory, and the memory may be a non-transitory computer-readable storage medium.

As used herein, a non-transitory computer-readable storage medium refers to any type of physical memory on which information or data readable by a processor may be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums.

As referred to herein, a "memory" may comprise any type of computer-readable storage medium unless otherwise specified. A computer-readable storage medium may store instructions for execution by a processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

Figure 6:
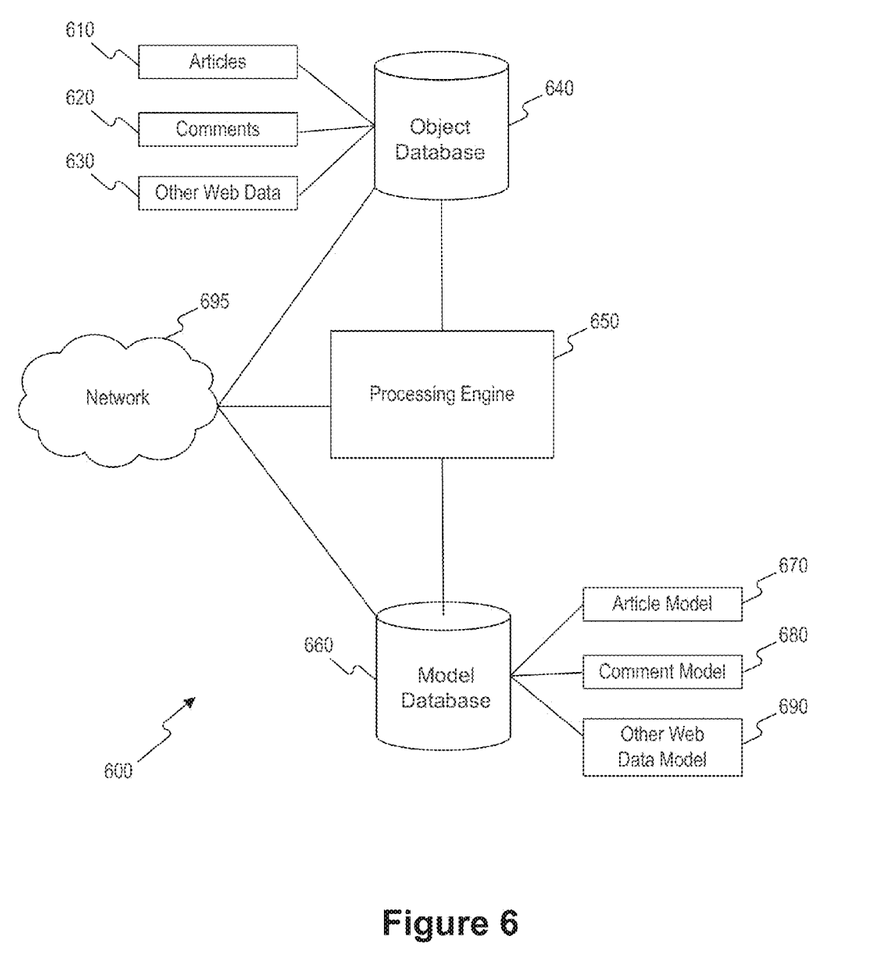
FIG. 6 illustrates an exemplary system environment for implementing embodiments of the present disclosure.

FIG. 6 illustrates an exemplary system environment for implementing embodiments of the present disclosure. Each of the processes depicted in FIGS. 1-5 may be implemented using the exemplary system shown in FIG. 6. For example, the learning phase 110 of FIG. 1 may use data 610, 620, and 630 stored in object database 640 to train one or more models using processing engine 650. Moreover, classifying phase 120 of FIG. 1 may involve using processing engine 650 to classify models 670, 680, and 690 and store them in model database 660. The training docs/data 210, 310, and 410 shown in FIGS. 2-4 may correspond to objects 610, 620, and 630, which may be stored in object database 640. Models 250, 350-390, and 540-565, shown in FIGS. 2, 3, and 5 may correspond to models 670, 680, and 690, which may be stored in model database 660. Moreover, the preprocessing and training elements shown in certain figures, such as preprocessing 220 and 430 and training 240 and 530, may be performed using processing engine 650 of FIG. 6. Further, it is to be understood that the system depicted in FIG. 6 is exemplary, and any other suitable means disclosed herein for implementing the disclosed embodiments may be used, such as a system employing one or more servers, as well as additional databases (or other storage devices) and processors.

In the exemplary embodiment of FIG. 6, a system 600 is provided. Consistent with the present disclosure, system 600 may be configured to perform methods for contextual classification of objects, such as those described herein. Among other things, system 600 may be implemented to store and process information pertaining to objects, such as web pages, articles, and comments, and process such information to train models for use in contextual classification of other objects.

System 600 may include one or more server systems, databases, and/or computing systems configured to receive information from entities in a network, such as network 695, process the information, and/or communicate the information with other entities in the network, according to the exemplary embodiments described herein. More specifically, system 600 may be configured to receive and store data associated with objects transferred over a network such as the Internet, process/analyze the data to create vectorized objects, utilize the vectorized objects to train models according to machine learning techniques, identify one or more optimal models for contextual classification of objects, and classify one or more objects using the one or more identified optimal models.

In one embodiment, various components of system 600 may include an assembly of hardware, software, and/or firmware, including a memory, a central processing unit ("CPU"), and/or a user interface. Memory may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. A CPU may include one or more processors for processing data according to a set of programmable instructions or software stored in the memory. The functions of each processor may be provided by a single dedicated processor or by a plurality of processors. Moreover, processors may include, without limitation, digital signal processor (DSP) hardware, or any other hardware capable of executing software. An optional user interface may include any type or combination of input/output devices, such as a display monitor, keyboard, and/or mouse.

In accordance with certain embodiments, system 600 may store one or more objects, such as articles 610, comments 620, and other web data 630, in an object database 640. Alternatively, only select data pertaining to objects, such as objects 610-630, may be stored in object database 640, and the objects 610-630 themselves may be stored elsewhere, such as on network 695. Object database 640 may be any suitable type of large scale data storage device, which may optionally include any type or combination of slave databases, load balancers, dummy servers, firewalls, back-up databases, and/or any other desired database components.

In one embodiment, system 600 may also include a processing engine 650. Processing engine 650 may comprise a Hadoop cluster including a Hadoop distributed file system ("HDFS") that is configured to stage input data, perform data processing, and store large-volume data output. It will be appreciated that the HDFS may include any desired number or arrangement of clustered servers or machines, as needed to provide suitable efficiency, storage space, and/or processing power. Although certain embodiments of the present disclosure are described with reference to a Hadoop cluster, it will be appreciated that any type of processing system may be used in the alternative.

In one embodiment, processing engine 650 may be configured to preprocess training objects, such as objects 610-630, to form vectorized objects, as illustrated, for example, by FIG. 4. Processing engine 650 may utilize tokenizers, stop-word filters, stemmers, feature filters, and/or vectorizers to preprocess training objects, as discussed in further detail herein. Processing engine 650 may also be configured to train one or more models using the vectorized objects, as illustrated, for example, by FIG. 5. To train the one or more models, processing engine 650 may utilize one or more machine learning tools, such as Mahout, Mallet, libsvm, and Weka, and implement one or more algorithms, such as SVM, Perceptron/Winnow, Bayesian, decision tree, and AdaBoost, as described in additional detail herein. Moreover, processing engine 650 may compare the one or more models to determine the optimal model for performing contextual classification on a specific set of objects.

In accordance with certain embodiments, system 600 may store the optimal classification models identified by processing engine 650 in model database 660. Similar to object database 640, model database 660 may be any suitable type of large scale data storage device, which may optionally include any type or combination of slave databases, load balancers, dummy servers, firewalls, back-up databases, and/or any other desired database components. Further, model database 660 may store one or more optimal models for each object type analyzed by processing engine 650, such as article model 670, comment model 680, and other web data model 690. Moreover, model database 660 may store one or more models directed to specific subclasses within the article, comment, and other web data classes, such as a sports model, politics model, and religion model (not shown). After processing engine 650 has created one or more optimal classification models and stored the models in model database 660, these models may be used by processing engine 650 to classify additional objects.

According to certain embodiments, object database 640, processing engine 650, and model database 660 may transmit information over a network 695 to implement the contextual classification methods disclosed herein. In one embodiment, network 695 may be a public network, such as the Internet. In an alternative embodiment, network 695 may be a private network, such as a corporate local area network. Object database 640 may communicate with network 695 to collect and store objects, such as articles 610, comments 620, and other web data 630, as well as information pertaining to content reviewers' tags/classifications of those objects. Model database 660 may communicate information regarding classification models, such as article model 670, comment model 680, and other web data model 690, over network 695. Moreover, in accordance with certain embodiments, processing engine 650 may collect training data directly from network 695, preprocess the training data and train models based on the collected data, and use those models to classify objects retrieved directly from network 695.

It will be appreciated that any suitable configuration of software, processors, and data storage devices may be selected to carry out the disclosed features and aspects of system 600. The software and hardware associated with system 600 may be selected to enable quick response to various business needs, relatively fast prototyping, and delivery of high-quality solutions and results. An emphasis may be placed on achieving high performance through scaling on a distributed architecture. The selected software and hardware may be flexible, to allow for quick reconfiguration, repurposing, and prototyping for research purposes. The data flows and processes described herein are merely exemplary, and may be reconfigured, merged, compartmentalized, and combined as desired. The exemplary modular architecture described herein may be desirable for performing data intensive analysis. A modular architecture may also be desired to enable efficient integration with external platforms, such as content analysis systems, various plug-ins and services, etc. Finally, the exemplary hardware and modular architecture may be provided with various system monitoring, reporting, and troubleshooting tools.

Figure 7:
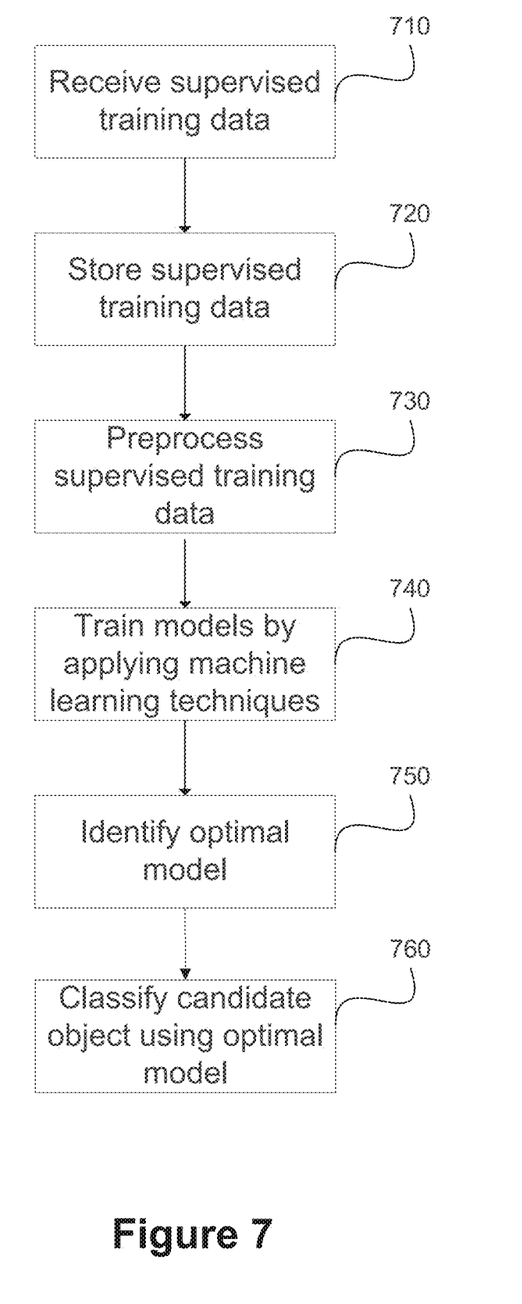
FIG. 7 illustrates a flow diagram of an exemplary method for performing contextual classification of objects, in accordance with an embodiment of the present disclosure.

FIG. 7 depicts a flow diagram for an exemplary method for performing contextual classification of objects, in accordance with an embodiment of the present disclosure. The exemplary method of FIG. 7 may be implemented with a computerized system or platform, such as that illustrated in FIG. 6.

In step 710, supervised training data may be received from at least one content reviewer. For example, supervised training data may be transmitted over a network, such as network 695, from an editor, an author, or a third-party user. In one embodiment, this training data may be transmitted over a network to a server, database, or processing engine, such as object database 640 or processing engine 650. The supervised training data is stored in a database, such as object database 640, in step 720.

In step 730, the supervised training data may be preprocessed to form at least one vectorized object. For example, the preprocessing of step 730 may comprise one or more of stemming, tokenization, and n-gram analysis. The at least one vectorized object may be used to train a plurality of models by applying a plurality of machine learning algorithms thereto in step 740. For example, step 740 may include applying one or more of the SVM, Perceptron/Winnow, Bayesian, decision tree, and AdaBoost algorithms to the at least one vectorized object to obtain a plurality of models. Steps 730 and 740 may be performed on one or more processors, such as the one or more processors comprising processing engine 650. In one embodiment, the preprocessing of step 730 of multiple objects may be distributed over multiple processors of processing engine 650 to improve efficiency. Similarly, the plurality of models trained in step 740 may be trained using multiple processors of processing engine 650 as well. Alternatively, at least one processor may be used for steps 730 and 740, if the volume of data to be preprocessed and trained is sufficiently small. In accordance with certain embodiments, steps 730 and 740, as well as other steps of the exemplary method depicted in FIG. 7, may be performed using one or more machines forming a Hadoop cluster.

An optimal model may be identified in step 750 from the models trained in step 740. In one embodiment, the models trained in step 740 may be compared in step 750 using processing engine 650, or any other processor or processors, to determine the most efficient model for classifying a set of objects. Optimal models, such as article model 670, comment model 680, and other web data model 690, may be stored in model database 660 for future use. In step 760, an optimal model may be used to classify a candidate object. For example, an optimal model may be used to classify an article or to filter an abusive comment. In one embodiment, step 760 may be performed using processing engine 650 on candidate objects obtained from network 695.

In this disclosure, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, advantageous results still could be achieved if steps of the disclosed techniques were performed in a different order and/or if components in the disclosed systems were combined in a different manner and/or replaced or supplemented by other components. Other implementations are within the scope of the following exemplary claims.

Therefore, it is intended that the disclosed embodiments and examples be considered as exemplary only, with a true scope of the present disclosure being indicated by the following claims and their equivalents.

What is claimed is:

1. A computer-implemented method for performing contextual classification of objects, comprising:
   receiving supervised training data transmitted over a network from at least one content reviewer, the supervised training data comprising at least one comment and at least one tag specifying whether the at least one comment is abusive;
   storing the supervised training data in a database;
   preprocessing, with at least one processor, the supervised training data to form at least one vectorized object;
   training a plurality of models by applying a plurality of machine learning algorithms to each vectorized object in parallel;
   identifying, with at least one processor, an optimal model from the plurality of models; and
   filtering at least one abusive comment using the identified optimal model.

2. The computer-implemented method of claim 1, wherein the at least one content reviewer is selected from the group consisting of an editor, an author, and a third-party user.

3. The computer-implemented method of claim 1, wherein preprocessing the supervised training data to form at least one vectorized object comprises performing at least one operation selected from the group consisting of stemming, tokenization, and n-gram analysis.

4. The computer-implemented method of claim 1, wherein the plurality of machine learning algorithms comprises a support vector machine algorithm.

5. The computer-implemented method of claim 1, wherein:
   preprocessing the supervised training data to form at least one vectorized object comprises preprocessing the supervised training data using a plurality of machines operating in parallel.

6. A system for performing contextual classification of objects, comprising:
   a database configured to store supervised training data collected from at least one content reviewer, the supervised training data comprising at least one comment and at least one tag specifying whether the at least one comment is abusive;
   at least one processor configured to:
      preprocess the supervised training data to form at least one vectorized object;
      train a plurality of models by applying a plurality of machine learning algorithms to each vectorized object in parallel;
      identify an optimal model from the plurality of models; and
      filter at least one abusive comment using the identified optimal model.

7. The system of claim 6, wherein the at least one content reviewer is selected from the group consisting of an editor, an author, and a third-party user.

8. The system of claim 6, wherein preprocessing the supervised training data to form at least one vectorized object comprises performing at least one operation selected from the group consisting of stemming, tokenization, and n-gram analysis.

9. The system of claim 6, wherein the plurality of machine learning algorithms comprises a support vector machine algorithm.

10. The system of claim 6, wherein:
preprocessing the supervised training data to form at least one vectorized object comprises preprocessing the supervised training data using a plurality of machines operating in parallel.

11. A non-transitory computer-readable storage medium including instructions for performing contextual classification of objects, which, when executed by at least one processor, cause the processor to perform steps comprising:
collecting supervised training data from at least one content reviewer, the supervised training data comprising at least one comment and at least one tag specifying whether the at least one comment is abusive;
preprocessing the supervised training data to form at least one vectorized object;
training a plurality of models by applying a plurality of machine learning algorithms to each vectorized object in parallel;
identifying an optimal model from the plurality of models; and
filtering at least one abusive comment using the identified optimal model.

12. The non-transitory computer-readable storage medium of claim 11, wherein the at least one content reviewer is selected from the group consisting of an editor, an author, and a third-party user.

13. The non-transitory computer-readable storage medium of claim 11, wherein the step of preprocessing the supervised training data comprises performing at least one operation selected from the group consisting of stemming, tokenization, and n-gram analysis.

14. The non-transitory computer-readable storage medium of claim 11, wherein the plurality of machine learning algorithms comprises a support vector machine algorithm.

15. The non-transitory computer-readable storage medium of claim 11, wherein:
the step of preprocessing the supervised training data comprises preprocessing the supervised training data using a plurality of machines operating in parallel.

* * * * *